June 26, 1962 S. R. CRAY ETAL 3,041,466

MAGNETIC CORE CIRCUITS

Filed Nov. 19, 1956 5 Sheets-Sheet 1

INVENTORS

SEYMOUR R. CRAY
ARNOLD P. HENDRICKSON

BY Cushman, Darby & Cushman

ATTORNEYS

INVENTORS
SEYMOUR R. CRAY
ARNOLD P. HENDRICKSON

BY Cushman, Darby & Cushman
ATTORNEYS

INVENTORS
SEYMOUR R. CRAY
ARNOLD P. HENDRICKSON

BY Cushman, Darby & Cushman
ATTORNEYS

INVENTORS
SEYMOUR R. CRAY
ARNOLD P. HENDRICKSON

BY Cushman, Darby & Cushman
ATTORNEYS

June 26, 1962 S. R. CRAY ETAL 3,041,466

MAGNETIC CORE CIRCUITS

Filed Nov. 19, 1956 5 Sheets-Sheet 5

INVENTORS
SEYMOUR R. CRAY
ARNOLD P. HENDRICKSON

BY Cushman, Darby & Cushman
ATTORNEYS

United States Patent Office 3,041,466
Patented June 26, 1962

3,041,466
MAGNETIC CORE CIRCUITS
Seymour R. Cray, Minneapolis, and Arnold P. Hendrickson, Richfield, Minn., assignors to Sperry Rand Corporation, New York, N.Y., a corporation of Delaware
Filed Nov. 19, 1956, Ser. No. 623,039
45 Claims. (Cl. 307—88)

This invention relates to magnetic devices which utilize the hysteresis characteristic of magnetic materials as a means for storing and handling information, and more particularly, to circuits and apparatus for determining the state of, or transferring information from, such magnetic devices.

The value of small cores of magnetic material for use as storage and logical elements in electronic data handling systems is being increasingly recognized, particularly because of their miniature size, low power requirements, dependability and ability to retain stored information for long periods of time in spite of power failure. These magnetic elements are able to store binary information in the form of static residual magnetization after being even momentarily magnetized to saturation in either of two directions. The saturation can be achieved by passing a current pulse through a winding on the magnetic element. Switching can be accomplished by applying a current pulse, which may conveniently be termed a read pulse, to a winding to create a surge of magnetomotive force in the sense opposite to the pre-existing flux direction, thereby driving the element to saturation in the opposite polarity. In so doing, a voltage pulse will be induced in all windings on the element. On the other hand, an applied read pulse which drives the small core further into saturation in the pre-existing flux direction produces a change in flux which is small compared to that created in reversing its polarity and hence induces a voltage in its windings that is much smaller than the reversing induced voltage.

In order to achieve a good ratio between the magnitudes of the two induced voltages, the magnetic material of the element is preferably one having a generally rectangular hysteresis characteristic so that the residual flux density is a relatively large percentage of the flux density present during the application of a saturating magnetomotive force. A number of suitable magnetic materials are available such as "mumetal," "Permalloy" and ferromagnetic ferrites. In order to improve high frequency response by reducing eddy current losses, "mumetal" and "Permalloy" are preferably used in thin strips which may be wrapped around miniature spools while ferrite elements may be molded and windings placed directly thereon, inasmuch as ferrites are relatively free from eddy current effects.

This invention provides magnetic devices for an improved generalized digital data handling system. In this system, magnetic devices consisting of small magnetic cores, together with diodes and a small number of resistors and capacitors, can be used to form data processing equipment. Each core may have a multiplicity of windings (a maximum of three are necessary) and interconnection of the windings of several elements through diodes form logical switching networks. By proper arrangement in these logical networks any arithmetic process reducible to numerical form can be performed.

Transfer of information from one element to another is provided by a "read pulse" and a "transfer pulse." The read pulse is an electrical impulse which samples the cores containing information which results in either a positive or an essentially zero potential being developed across the "read" winding. The transfer pulse is an electrical impulse which is diverted through the above-mentioned read winding when the potential is zero and is switched to an input winding in another magnetic element when the potential across the read winding is positive. The reaction of the information cores to the read pulse switches the transfer pulse. When the transfer pulse is diverted through the read winding the information transferred is a "0." When a positive potential is present across the read winding the information transferred is a "1." The transfer pulse is thus switched to a winding on a second core producing a magnetomotive force which drives said second core to opposite polarity, provided the magnetomotive force exceeds a certain critical value and is applied in the direction opposite to the remanent magnetization.

Each magnetic core may be involved in one of three types of operations. These are:

(1) Read—A magnetic core is unconditionally forced to the magnetic polarity arbitrarily designated at "cleared."

(2) Set—A magnetic core is either conditionally or unconditionally forced to the magnetic polarity arbitrarily designated as "set."

(3) Clear—A magnetic core is conditionally forced to the magnetic polarity arbitrarily designated as "cleared."

The read operation transfers information out of the magnetic core while the latter two operations transfer information into the magnetic core.

Each operation on any one magnetic core must be time separated. This can be accomplished by a multi-phase clock on the read pulses and a multi-phase clock on the transfer pulses.

Accordingly, it is a primary object of our invention to provide improved magnetic devices for storing and handling information.

It is still another object of this invention to provide magnetic devices wherein the maximum number of necessary windings per magnetic core is three.

It is a still further object to provide magnetic devices in which there is a time delay between the sensing of information in one magnetic device and the transfer of said information to other magnetic devices.

It is another object of this invention to provide a circuit for detecting the state of a magnetic device, said circuit being operative with two signals, the second of which is delayed in its presentation to the magnetic device.

Another object of this invention is the provision of a circuit for detecting the state of a magnetic core, said circuit including winding means on the core subject to two signals one of which is delayed with respect to the other and is separated therefrom in circuit by a unidirectional device in such a manner that when the earlier signal does not cause shift of the core, there will be no output from the circuit.

Another object of this invention in conjunction with the preceding object is the provision of such a circuit as means for transferring information from said core to another core at a voltage limited in amplitude.

Another object of this invention is the provision of logical networks in conjunction with the preceding objects.

Still another object of this invention is the provision of a bit register utilizing a transfer circuit in accordance with the preceding objects.

Other objects and advantages of this invention will become obvious to those of ordinary skill in the art by reference to the following detailed description of the exemplary embodiments of the apparatus and the appended claims. The various features of the exemplary embodiments according to the invention may best be understood with reference to the accompanying drawings, wherein:

Figure 6:
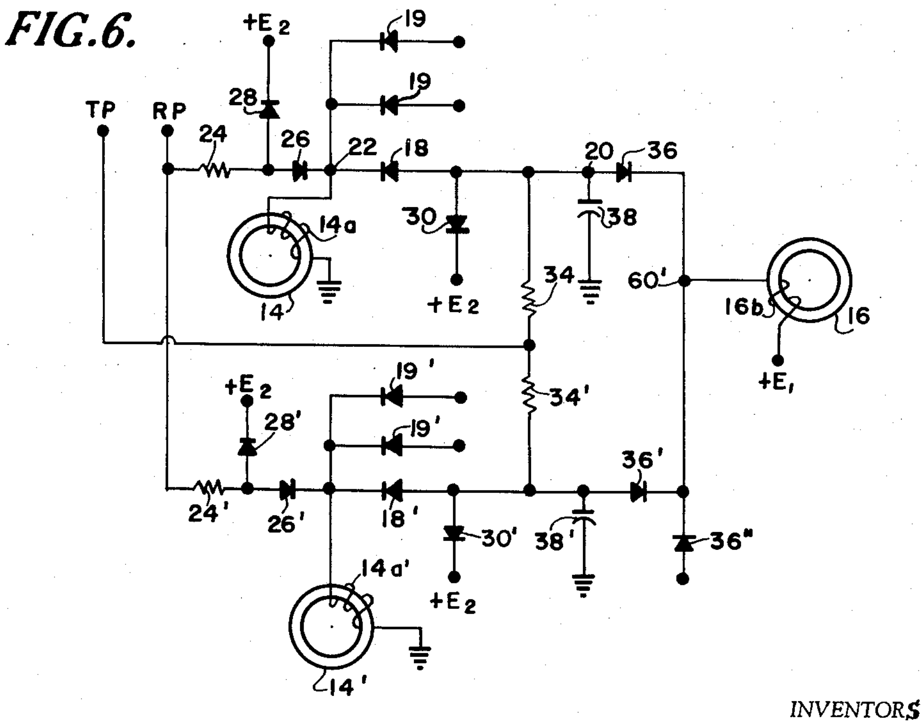
Figure 5:
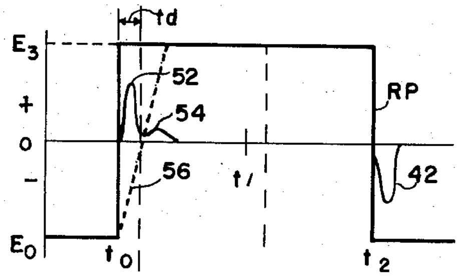
Figure 5A:
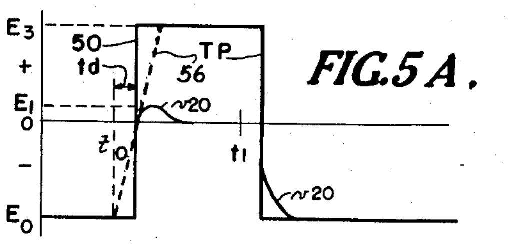
Figure 7:
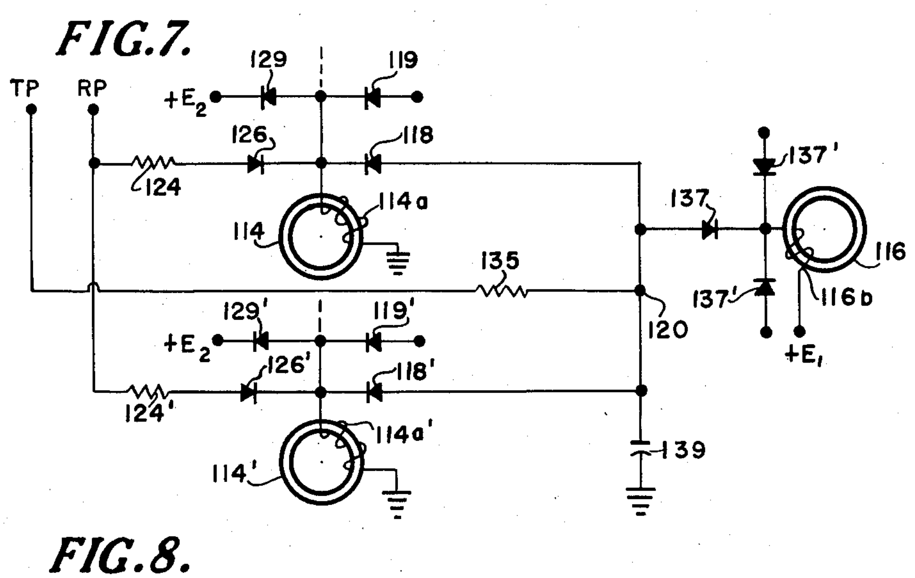
Figure 8:
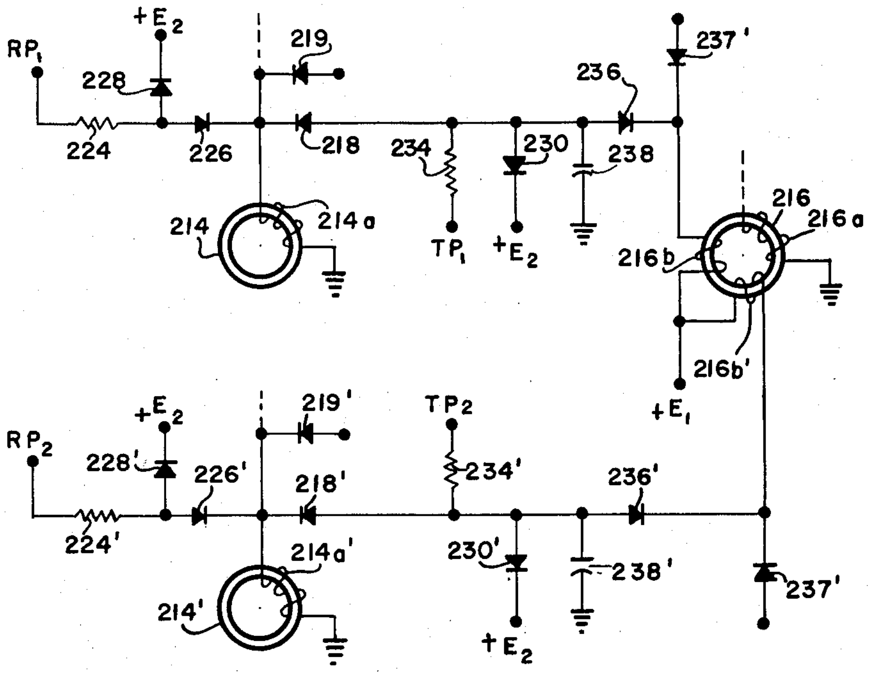
Figure 9:
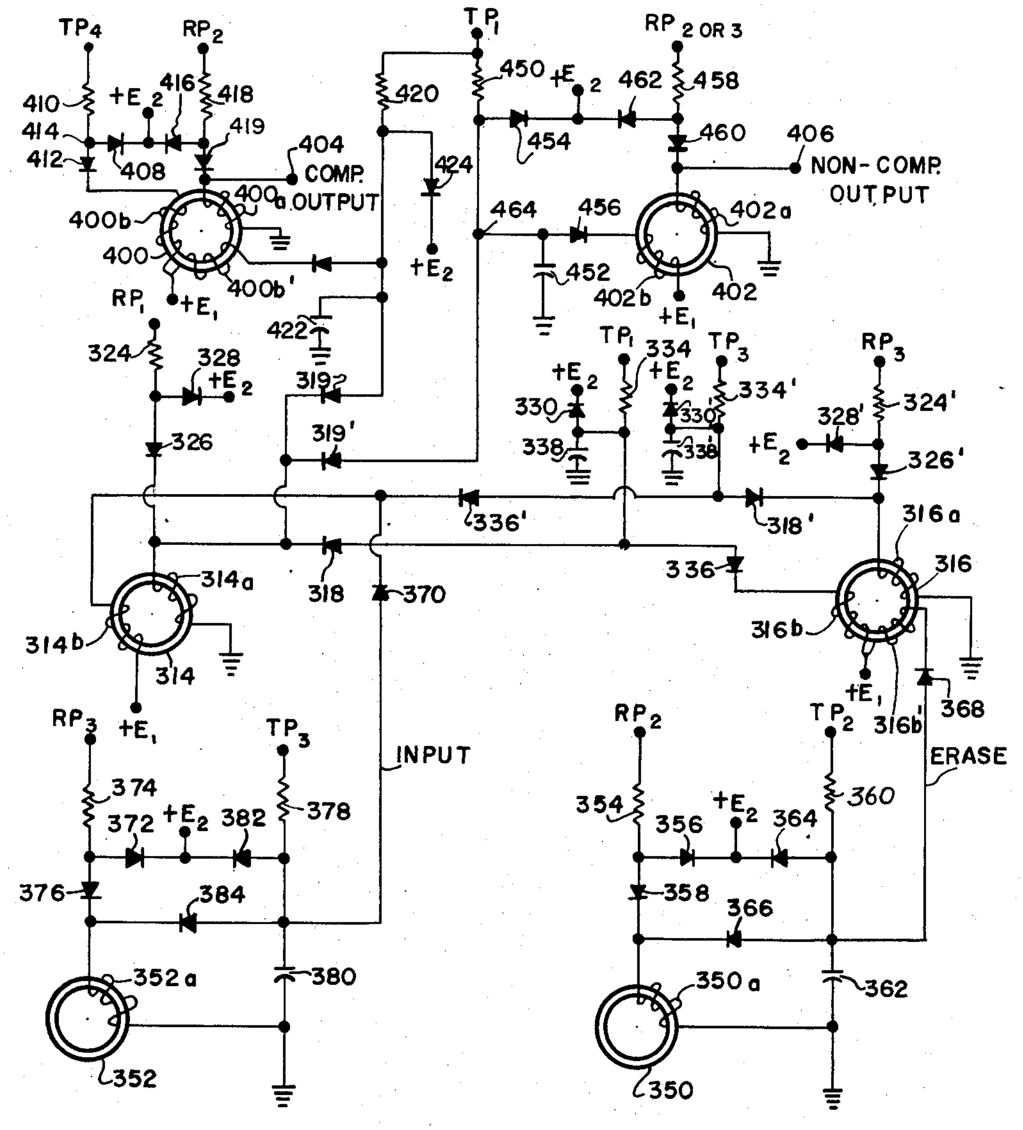
Figure 10:
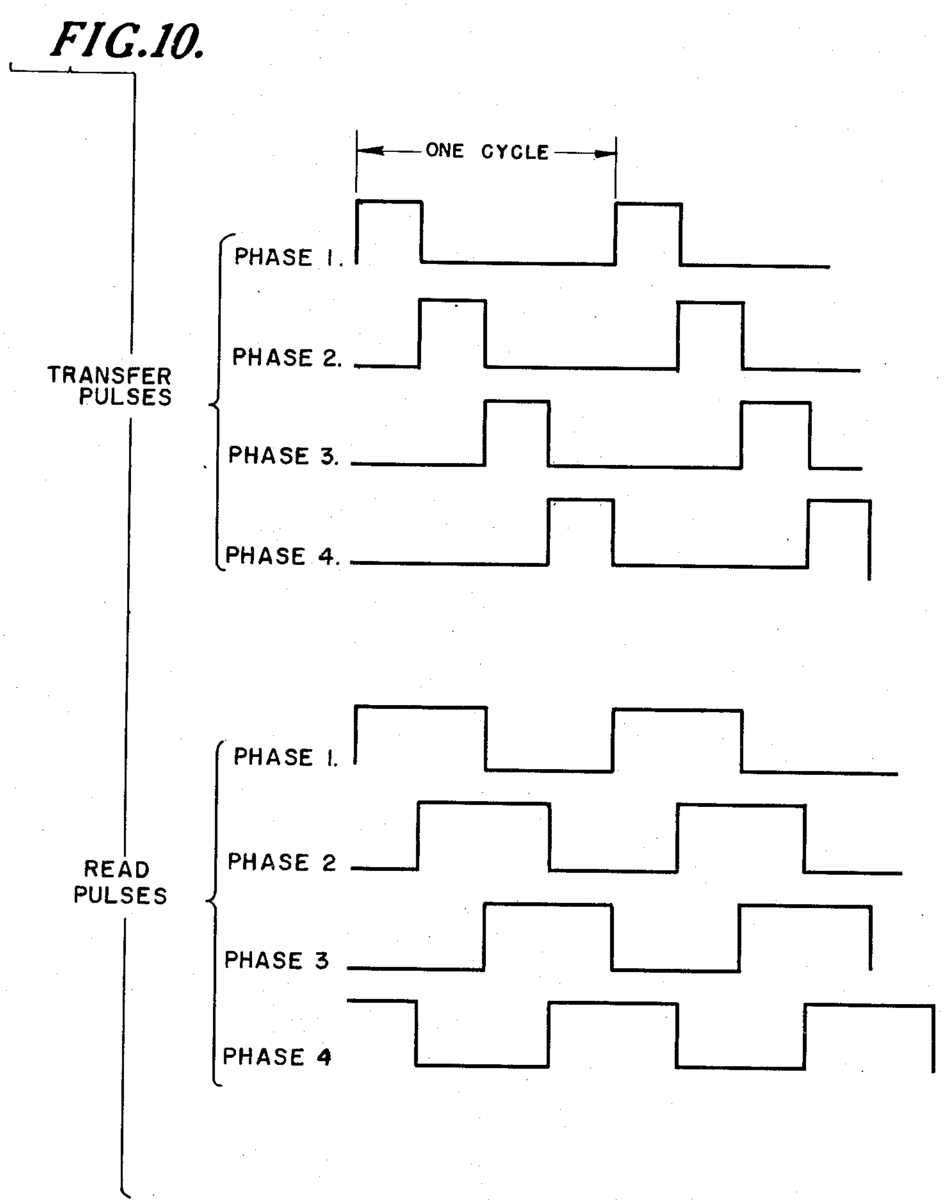

FIGURES 5 and 5A illuustrate waveforms to be expected in a transfer circuit during a "0" transfer wherein the transfer pulse is initially delayed with respect to the read pulse;

FIGURE 6 illustrates a circuit in accordance with the invention for performing the logical function "OR" wherein three magnetic devices are involved;

FIGURE 7 illustrates a circuit in accordance with the invention for performing the logical function "AND" wherein three magnetic devices are involved;

FIGURE 8 illustrates a circuit in accordance with the invention for performing the logical function "AND-NOT" wherein three magnetic devices are involved;

FIGURE 9 illustrates the invention in the form of a bit register with one input and two output circuits, and FIGURE 10 is a chart of waveforms for use with the register of FIGURE 9.

Figure 1:
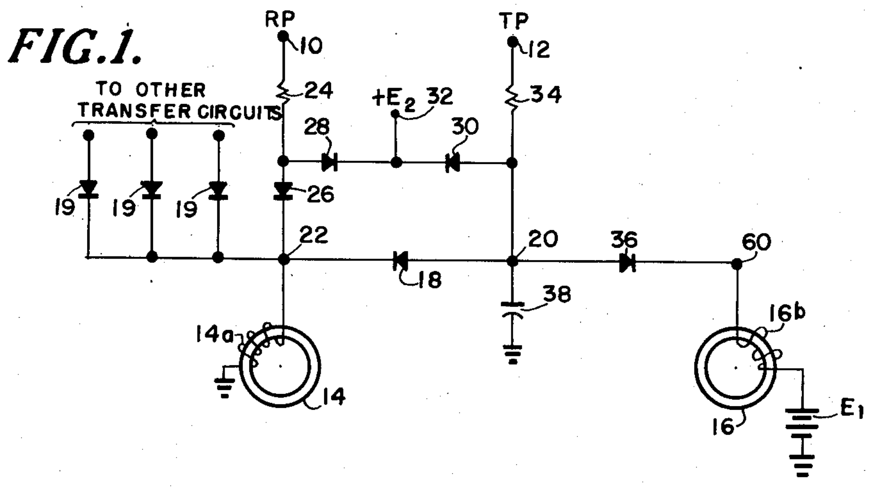
FIGURE 1 illustrates an information transfer circuit involving two magnetic devices and including therein a circuit for detecting the state of one of said devices.

The circuit illustrated in FIGURE 1, upon application of voltage impulses to terminals 10 and 12, transfers information initially stored in the bistable magnetic core 14 to a load such as the bistable magnetic core 16. A common electrical impulse drive source may be used for said voltage impulses; however, it has been determined that separate sources are better since it is advantageous to make the drive impulses applied to terminal 10 of longer duration than those applied to terminal 12. A longer impulse at terminal 10 allows the use of imperfect transfer diodes in that the extended portion of the impulse prevents the reverse currents of the diodes 18 and 19 from resetting magnetic core 14 after it has just been cleared. That is, after the transfer pulse to terminal 10 ends, junction 20 becomes negative, as shown by waveform $v_{20}$ after time $t_1$ in FIGURES 2A and 3A, causing a reverse (enhancement) current in diode 18. Such reverse current if allowed to flow in winding **14*a* would tend to, and might, reset magnetic core 14, and if more transfer circuits are connected to junction 22 as through diodes 19, greater reverse current would flow in said winding and cause reset of core 14. However, by maintaining the pulse at terminal 10 longer than that at terminal 12, any reverse current is furnished from such extended pulse through resistor 24 and diode 26 rather than from ground through output winding 14*a*, which latter situation would be the case if the pulse to terminal 10 were not extended beyond the end of the pulse to terminal 12. In one embodiment, the read pulse RP applied to terminal 10 is, for example, twice the length of the transfer pulse TP applied to terminal 12. Thus two electrical impulse sources are preferable for each transfer circuit, but it is to be understood that the invention is not limited thereto since a common drive source may be used along with transfer diodes 18 and/or 19** which exhibit little or no enhancement or reverse current effect.

Voltages generated in the transfer circuit are limited by clamping diodes 28 and 30 to voltage $E_2$ connected to terminal 32. The preferred location of these diodes is shown in FIGURE 1 wherein each diode clamps the voltage generated by one drive pulse, thus limiting the current through said clamping diode to only one drive source. An alternative voltage amplitude limiting arrangement usable with this invention is the connection of a single diode with its reference voltage $E_2$ to junction 22 in the manner shown in FIGURE 7 and hereinafter explained in more detail. The voltages at junctions 20 and 22 may be clamped to voltage $E_2$ for a maximum positive value of eight volts, for example. Diode 26, not necessary for operation of a single transfer circuit when the base voltage of each RP pulse is zero or has an amplitude (negative in the embodiment under consideration) insufficient to cause core 14 to change its state, provides isolation between core 14 and various other magnetic devices (not shown) which may be connected via diodes 19 and which share the same read pulse drive source. That is, it prevents changes in one magnetic device from being applied to any other magnetic device through the common drive source RP. Resistors 24 and 34 limit the currents from the read pulse and transfer pulse sources respectively. Diodes 19 may connect output winding **14*a* to other transfer circuits (not shown) in the same manner as diode 18 connects output winding 14*a* to the transfer circuit including junction 20 and the transfer pulse TP for providing an input to magnetic core 16 via output diode 36 and input winding 16*b* which is held above ground by a positive potential $E_1$. In conjunction with resistor 34, capacitor 38 connected between junction 20** and ground provides a slight delay in the operation of the transfer pulse TP which delay increases the reliability of the circuit as hereinafter explained.

Figure 2:
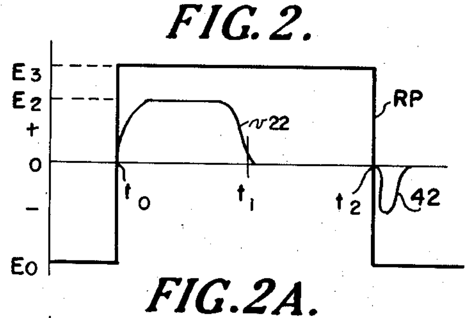
FIGURES 2 and 2A illustrate waveforms associated with the circuit illustrated in FIGURE 1 during a "1" transfer.
Figure 2A:
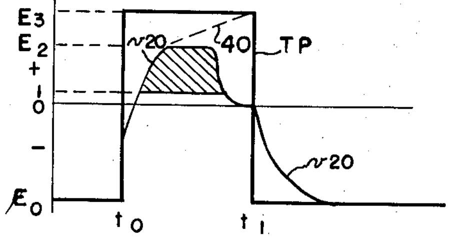

The operation of the circuit shown in FIGURE 1 is best explained in conjunction with FIGURES 2, 2A and 3, 3A. First assume core 14 is initially in a magnetic state referred to as "set" so as to be storing a "1" and core 16 is initially in a "cleared" magnetic state storing a "0"; therefore, upon applying read and transfer pulses, a "1" will be transferred to magnetic core 16 whereby it becomes set. The waveforms in FIGURES 2 and 2A illustrate such a transfer. Prior to time $t_0$, junction 22 is at zero or ground potential while terminals 10 and 12 and consequently junction 20 are held at negative voltage $E_0$. At time $t_0$ a read pulse RP of positive voltage $E_3$ is applied to terminal 10, and at the same time a transfer pulse TP of similar voltage is applied to terminal 12.

The current through resistor 24 and diode 26 flows through winding **14*a* until voltage $E_2$ is induced across said winding, then the current divides between the clamp diode 28 and winding 14*a*. The potential at junction 22, therefore, initially rises rapidly toward the read pulse voltage $E_3$, but is clamped at voltage $E_2$ by diode 28. Voltage $E_2$ is maintained across winding 14*a* until time $t_1$ at which time the flux has completely switched and saturated magnetic core 14 to its cleared polarity state. This switching is illustrated in FIGURE 2 by the wave designated $v_{22}$ which represents the voltage induced in winding 14*a***.

As shown in FIGURE 2A, the transfer pulse TP is also applied at time $t_0$ but to terminal 12 and causes the potential of junction 20 to rise more or less exponentially, because of the RC combination of resistor 34 and condenser 38, from negative voltage $E_0$ towards the positive transfer pulse voltage $E_3$, as shown by the rising portion of waveform $v_{20}$ and the extended dashed line 40. The voltage of junction 20, i.e., the voltage across condenser 38, upon reaching voltage $E_2$ is clamped there by diode 30; thus, no current then flows through diode 18. For values of potential at junction 20 greater than bias voltage $E_1$, current from the transfer pulse will flow through diode 36 and winding **16*b* in a direction to switch magnetic core 16 with a constant voltage $E_2$—$E_1$ across its winding 16*b*. The shaded area of wave $v_{20}$ illustrates the voltage-time integral of this switching action. A function of diode 36 is to isolate magnetic device 16** from other elements (not shown) which may be connected to the same transfer pulse source.

The switching time of magnetic core 14 must be greater than that of core 16, for if the voltage at junction 22 drops below voltage $E_2$ before core 16 has been completely switched, the transfer current needed to completely switch magnetic core 16 will be diverted through diode 18 to winding **14*a***. This inequality of switching time may be achieved by using more turns on winding 14a than on winding 16b. The difference in number of turns must be sufficient to compensate for the delay incurred in voltage buildup of junction 20 and the reduced switching voltage ($E_2$—$E_1$ as opposed to $E_2$) across winding 16b. It has been found that, with Remington Rand 8 wrap metallic ribbon cores with a 0.1" O.D. bobbin, reliable circuit operation is achieved by making winding 14a a "2.5N" turn winding and winding 16b an "N" turn winding.

The negative voltage impulse 42 of wave $v_{22}$ occurring after time $t_2$ is caused by magnetic core 14 relaxing to remanent magnetization upon removal of the saturating read pulse. Diodes 18, 19 and 26 prevent this voltage from affecting other circuits. Any negative voltage impulse caused by magnetic core 16 returning to remanent magnetization is not noticeable as the voltage on junction 20 falls exponentially to voltage $E_0$ after removal of the transfer pulse.

Figure 3:
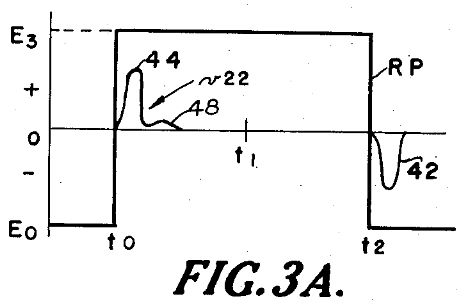
FIGURES 3 and 3A illustrate waveforms associated with the circuit illustrated in FIGURE 1 during a "0" transfer.
Figure 3A:
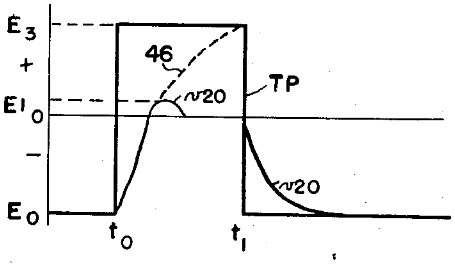

Now assume magnetic core 14 is initially "cleared"; therefore, upon application of read and transfer pulses, magnetic core 16 must not be magnetically altered, i.e., a "0" instead of a "1" must be transferred. FIGURES 3 and 3A illustrate the waveforms associated with such a transfer. Any current which flows in winding 16b tends to set the magnetic core, therefore care must be taken to prevent current from flowing in winding 16b during a "0" transfer. The critical point is when the current from the read pulse initially flows in winding 14a at time $t_0$ changing the magnetic state from remanent magnetization in the cleared direction toward saturation magnetization in the cleared direction. This causes a flux transient, and consequently, a narrow positive voltage impulse 44 at junction 22 as shown in FIGURE 3 in waveform $v_{22}$ between times $t_0$ and $t_1$. If the voltage of junction 20 is allowed to become more positive than voltage $E_1$ before the large positive impulse 44 has subsided, i.e., before the flux transient due to the read pulse has subsided, current may undesirably pass through diode 36 to set core 16. The voltage buildup across condenser 38 from negative voltage $E_0$ as shown by waveform $v_{20}$ in FIGURE 3A follows an exponential curve illustrated in extension by dashed line 46. The second but smaller positive voltage impulse 48 in waveform $v_{22}$ is caused by current from the transfer pulse passing through diode 18 and flowing in winding 14a. That is, the additional transfer pulse current through winding 14a drives magnetic core 14 further into saturation thereby inducing the small positive voltage pulse 48. When the flux in magnetic device 14 has reached its maximum, i.e., when waveform $v_{20}$ has reached its maximum, the voltages of junctions 20 and 22 are close to zero and diode 18 may or may not be cut off. However, if further conduction through diode 18 is blocked by any second short impulse 48 so as to tend to cause current from the transfer pulse to flow in winding 16b, the positive voltage $E_1$ creating a voltage threshold counteracts such flow and prevents setting of core 16. Depending on circuit parameters, the optimum value of voltage $E_1$ may allow a small current from the second smaller voltage impulse to flow in winding 16b.

Figure 4:
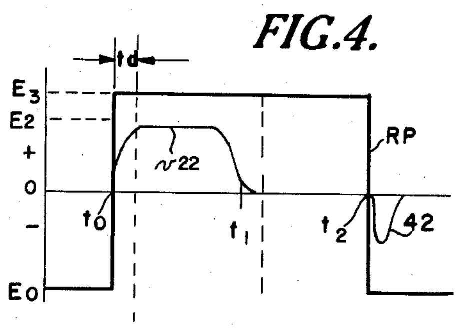
FIGURES 4 and 4A illustrate waveforms to be expected in a transfer circuit during a "1" transfer wherein the transfer pulse is initially delayed with respect to the read pulse.
Figure 4A:
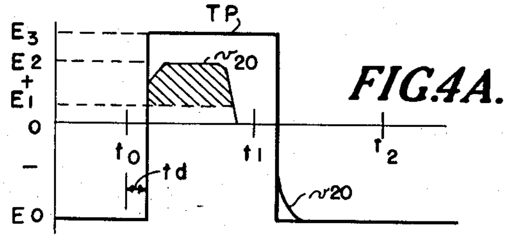

FIGURES 4 and 4A for a set core 14 and FIGURES 5 and 5A for a cleared core 14 illustrative waveforms associated with modifications for providing a delay between the sensing of one core and driving a second core with the output from said first core. The transfer pulse TP is initially delayed from time $t_0$ a small interval of time designated by letter $t_d$ in each of the figures. As shown in FIGURES 5 and 5A this period of time is sufficiently long to place the leading edge 50 of the transfer pulse TP immediately after the trailing edge of the first larger zero or sneak signal 52. Thus, such first zero signal cannot insert false information into a system.

The second small positive zero signal 54 is again caused by the additional current provided in the output winding by said transfer pulse. This effect is nullified as before by bias voltage $E_1$.

In applying the modification of initially delaying the transfer pulse TP a time $t_d$, to a transfer circuit such as the one shown in FIGURE 1, capacitor 38 is first eliminated. The transients on junction 20, therefore, do not behave exponentially but follow more closely the shape of the applied transfer pulses. This same result can be obtained by starting both the read and transfer pulses at time $t_0$ but making the rise time of the transfer pulse longer than the rise time of the read pulse as illustrated by dotted line 56 in FIGURES 5 and 5A. However, of the three stated ways to accomplish the desired delay in voltage buildups, the preferred method is to use capacitor 38.

Reference is now made to FIGURE 6 which illustrates a logical "OR" network utilizing the circuit of FIGURE 1. When a read pulse is applied to terminal RP and a transfer pulse applied to terminal TP, magnetic core 16 will be set if either magnetic core 14 or 14′ or both are set previous to the transfer. This is the function of a logical "OR" network which may be formed simply by taking two transfer circuits of the type shown in FIGURE 1 and connecting them together at the junction therein designated by numeral 60. In FIGURE 6 junction 60′ forms such a connection of two transfer circuits involving magnetic cores 14 and 14′ respectively. The transfer circuit associated with core 14′ is similar in operation and composition to that for core 14, so the components thereof are numbered the same with only the addition thereto of a single prime mark. The operation of both of these transfer circuits is the same as the transfer circuit of FIGURE 1. A positive voltage impulse generated by either magnetic core 14 or 14′ will cause a transfer current to flow through set winding 16b thereby setting magnetic core 16. An additional transfer circuit may be added to junction 60′ via diode 36″. Almost an unlimited number of additional transfer circuits may be connected together in the manner described to form an "OR" circuit. The circuit of FIGURE 6 is connected to read and transfer pulses so that both information transfers occur simultaneously. This is the preferred arrangement, however, the transfer from magnetic core 14′ may be time separated from the transfer from magnetic core 14.

With reference now to FIGURE 7 in which the circuit of FIGURE 1 is used to form a logical "AND" network, operation is such than when a read pulse is applied to terminal RP and a transfer pulse is applied to terminal TP, magnetic core 116 will be set if both magnetic cores 114 and 114′ are set previous to the transfer. This is the function of a logical "AND" circuit which may be formed simply by connecting two or more output windings through the output diodes 18 of FIGURE 1 together at the junction therein designated by numeral 20. Junction 120 in FIGURE 7 is such a connection involving two saturable magnetic cores 114, 114′ having windings 114a and 114a′, respectively, coupled via resistors 124, 124′ and diodes 126, 126′ to read pulses at terminal RP, and to transfer pulses at terminal TP through a single resistor 135, with a single condenser 139 accomplishing the necessary delay in transfering an output signal through diode 137 to winding 116b. In the logical "AND" circuit all read pulses and the transfer pulse must be applied simultaneously. If not so applied, the single transfer pulse will be wholly or partially diverted through either output winding 114a or 114a′. Also, if either magnetic core 114 or 114′ is cleared prior to transfer, the transfer pulse is diverted through either or both sense windings as described for the "0" transfer in the circuit of FIGURE 1. Thus, if both cores 114 and 114′ provide simultaneous positive voltage outputs, impulses flow through the set winding 116b on magnetic core 116.

In FIGURE 7 there is shown a modification of the voltage amplitude limiting means. The clamping diodes 129 and 129′ are shown connected to junctions 122 and 122′, respectively, rather than to the drive pulse resistors 124 and 124′ as in FIGURE 1. In this connection the clamping diode must pass the excess current through the read pulse and from all transfer pulses connected thereto. Also, current limitations of diodes limit the number of transfer circuits which may be connected to one output winding. Thus, the clamp diode arrangement of FIGURE 1 is the preferred arrangement.

Diodes 119 and 119′ may couple other transfer circuits for sharing cores 114 and 114′, respectively, while diodes 137′ may couple other magnetic cores or logical "AND" circuits to provide additional inputs to set winding 116*b*. Thus, as an input function to any given input winding, two level diode logic is provided. Meanwhile, the output windings of the magnetic cores contributing to this input function may be participating in numerous other input functions, for example, up to eight or ten such functions. Thus the number of magnetic elements required to perform a given data processing operation may be considerably less than in previous types of magnetic core circuits.

Reference is now made to FIGURE 8 which illustrates a logical "AND–NOT" network utilizing the circuit of FIGURE 1. With a read and a transfer pulse applied to terminals designated $RP_1$ and $TP_1$, respectively, during a time period which can be called phase 1, and similar read and transfer pulses applied to terminals designated $RP_2$ and $TP_2$, respectively, during a subsequent time period which can be called phase 2, magnetic core 216 will be set at the end of phase 2 if magnetic core 214 is set and 214′ is cleared prior to phase 1. This is the function of a logical "AND–NOT" circuit which may be formed by connecting a first transfer circuit associated with magnetic core 214 to winding 216*b*, transfer current in which sets magnetic core 216 during phase 1, and another transfer circuit associated with magnetic core 214′ to winding 216*b*′, a transfer current in which clears magnetic core 216 during phase 2. Windings 216*b* and 216*b*′ are preferably of opposite sense which allows all transfer currents to be of positive polarity in all information transfers. Both transfer circuits function in the same manner as the circuit of FIGURE 1, and are similarly composed with the first transfer circuit involving core 214 having an output winding 214*a* coupled by diode 226 and resistor 224 to terminal $RP_1$ and to terminal $TP_1$ by diode 218 and resistor 234. Diodes 228 and 230 clamp the read and transfer pulses, respectively, to voltage $E_2$, and condenser 238 delays the output through diode 236. The second transfer circuit including core 214′ has the same components as the first transfer circuit and said components are numbered the same with the addition of a prime mark. It is to be understood that other diode networks involving one or more magnetic cores may be connected to either winding 216*b* or 216*b*′ or both through diodes 237′ respectively as described for FIGURE 7. In addition, it is to be understood that the read and transfer pulses for the different transfer circuits of FIGURE 8 need not be time separated, but on the contrary, they may be coexistent with the output windings 214*a* and 214*a*′ being connected in parallel, respectively, to the same sources as shown in FIGURES 6 and 7.

FIGURE 9 illustrates this invention applied to form a magnetic core circuit similar to a flip-flop. This circuit which may be termed a "bit register" includes magnetic cores 314 and 316. A typical input circuit to this register includes magnetic cores 350 and 352 and two typical output circuits include magnetic cores 400 and 402. A bit register can be used to store information for periods longer than one clock cycle. The circuits in this specific embodiment are driven by a four-phase clock, the timing of which is illustrated in FIGURE 10. The read pulses are preferably twice the width of a transfer pulse so that a phase 1 read pulse coexists with the phase 1 and phase 2 transfer pulses. When a read pulse is applied to a magnetic core, that core is occupied for two transfer pulses.

Thus, in a four phase system each core is available for input transfers only during alternate phases of the four phase system, one of these phases being for a set input and the other for a clear input.

The information in the bit register of FIGURE 9 circulates between cores 314 and 316. A phase 1 read pulse transfer resistor 324 limited to voltage $E_2$ by diode 328 passes through diode 326 to winding 314*a*, while pulse $TP_1$ similarly limited to voltage $E_2$ by diode 330 is delayed by resistor 334 and condenser 338 to provide an output from diode 318 through diode 336 to input winding 316*b* when core 314 is shifted, thereby transferring a "1" to core 316. This information is returned to core 314 when a phase 3 read pulse limited to voltage $E_2$ by diode 328′ passes through resistor 324′ and diode 326′ to winding 316*a* while transfer pulse $TP_3$ limited to voltage $E_2$ by diode 330′ is delayed by resistor 334′ and condenser 338′ to provide an output from diode 318′ through diode 336′ to winding 314*b* when core 316 is shifted so that a "1" is transferred therefrom. A "1" in the bit register is represented by the recirculation of electrical impulses, whereas a "0" is a lack of such impulses.

If new information is to be inserted into the bit register, core 350 is set prior to phase 2 of any clock cycle and the new information is inserted in core 352 prior to phase 3 of the same clock cycle (core 352 is set for a "1" and cleared for a "0"). The read pulse $RP_2$ during phase 2 as applied through resistor 354, limited to voltage $E_2$ by diode 356, and through diode 358 to winding 350*a* causes core 350 to switch when previously set, thereby causing transfer current from pulse $TP_2$ as delayed by resistor 360 and condenser 362, limited to voltage $E_2$ by diode 364, and diverted by diode 366 to flow through diode 368 into winding 316*b*′, thereby clearing core 316. This operation "erases" the contents of the bit register. On phase 3 no "1" information may be transferred from core 316; that is, a "0" transfer is accomplished. Also on phase 3, the information in core 352, whether a "1" or "0," is transferred via diode 370 to core 314, the circuits with cores 316 and 352 forming in effect during phase 3 a logical "OR" network. That is, pulses $RP_3$ and $TP_3$ not only operate on core 316 but also on core 352 to transfer the information therein to core 314. Pulse $RP_3$ limited to voltage $E_2$ by diode 372 passes through resistor 374 and diode 376 to winding 352*a*, while pulse $TP_3$ is delayed by resistor 378 and condenser 380, limited to voltage $E_2$ by diode 382, and diverted by diode 384 through diode 370 when core 352 is storing a "1," but when storing a "0" no pulse is transferred. The bit register then contains the new information. On the next set of phase 1 pulses, core 314 transfers this information to cores 400 and 402 for output purposes and to core 316 for recirculation.

Terminal 404 provides a "complement" output whereas terminal 406 provides a "non-complement" output. This means that when a "1" is in the bit register, a "0" will be available at terminal 404 while a "1" is available at terminal 406 and vice versa. In the illustration magnetic core 400 is unconditionally set each phase 4. This is accomplished by feeding the transfer pulse $TP_4$ into set winding 400*b* through resistor 410 and diode 412 without at the same time feeding any reading or other pulse input to junction 414 or to winding 400*b*. However, it is within the scope of this invention to supply to junction 414 an input which provides a "gating" function for the complement output. Preferably, clamping diode 408 at junction 414 is used to provide consistent circuit operation since it maintains constant voltage switching. Because of the four phase clock, core 400 must be set on phase 4 and read out its information on phase 2. Therefore, pulse $RP_2$ limited to voltage $E_2$ by diode 416 is connected through resistor 418 and diode 419 to output winding 400*a*. Between phase 4 and the following phase 2, the information in the bit register is transferred to core 400. That is, pulse $TP_1$ as applied through a delay circuit including resistor 420 and condenser 422 and limited to voltage $E_2$ by diode 424, is diverted by diode 319 to a second input winding 400$b'$ on core 400 if there is a "1" in the bit register. This shifts core 400 back to a cleared state so that pulse $RP_2$ finds low impedance through winding 400$a$ and provides a "0" output. When the bit register contains a "0," core 400 is not shifted by pulse $TP_1$, so pulse $RP_2$ then provides a "1" output.

Magnetic core 402 is set on phase 1 by a "1" transfer from core 314 of the bit register. That is, pulse $TP_1$ as delayed by resistor 450 and condenser 452 while being limited to voltage $E_2$ by diode 454 is diverted by diode 319' through diode 456 to input winding 402$b$ when the bit register contains a "1." No clear winding is used on core 402 to set it unconditionally to "0" as was the case for core 400; therefore, this core may have its non-complementing information available at terminal 406 by a read pulse delivered on either phase 2 or 3, through resistor 458 and diode 460 to output winding 402$a$, the output being effectively limited to voltage $E_2$ by diode 462. A gating function may be added to this output magnetic core by imposing an "AND" function at junction 464 in the manner illustrated in FIGURE 7.

In a data processing system it is frequently necessary to provide other logical function networks than those described herein. Any such networks are intended to be within the scope of this invention.

It is to be understood that the reference herein to "saturable magnetic core elements" is intended to include any saturable magnetic element whether in toroidal core form or in film form as long as the hysteresis characteristics thereof are suitable for the practice of this invention. Additionally, the use of the term "winding" or the phrase "winding means" includes, where applicable, a conductor forming at least one turn about a magnetic element as by the mere passage of the conductor once through a toroidal core, or alternatively by the disposition of a conductor merely in proximity to a magnetic element so as to cause the desired effects.

Thus it is apparent that there is provided by this invention systems in which the various phases, objects and advantages herein set forth are successfully achieved.

Modifications of this invention are described herein will become apparent to those of ordinary skill in the art. Therefore it is intended that the matter contained in the foregoing description and the accompanying drawings be interpreted as illustrative and not limitative, the scope of the invention being defined in the appended claims.

What is claimed is:

1. Apparatus for detecting the state of a bistable magnetic core element comprising said element and a winding magnetically coupled thereto, means for non-inductively coupling and applying a first signal across said winding to cause said element to shift from a first stable state to a second stable state only if it was in said first state before application of said first signal and to thereby generate a substantial back E.M.F. across said winding, means for non-inductively coupling and applying in the same effective direction as said first signal a second signal across said winding at least in part concurrently with said first signal and including means responsive to said back E.M.F. for preventing effective coupling of the second signal to said winding at least when the first signal causes the element to change state as aforesaid, and means non-inductively coupled to the second signal coupling means for providing an output indicative of the state of said element, the arrangement being such that a substantial output occurs upon application of said signals concurrently at least in part if said core element was previously in said first state and is shifted to said second state by the effect of said first signal.

2. Apparatus as in claim 1 wherein the means for coupling said second signal to said winding includes a unidirectional current conducting device poled such that the said back E.M.F. generated across said winding by the first signal upon shift of the core element prevents conduction of said second signal through the unidirectional device.

3. Apparatus as in claim 2 wherein said first signal is of greater duration than said second signal whereby reverse current through said unidirectional device is prevented.

4. Apparatus as in claim 1 wherein said first and second signals are supplied from separate sources.

5. Apparatus as in claim 1 wherein said second signal is effectively coupled to said winding at a predetermined time following said first signal.

6. Apparatus as in claim 5 wherein said predetermined time is determined by a delay circuit in the second signal coupling means.

7. Apparatus as in claim 6 wherein the delay circuit includes a condenser.

8. Apparatus as in claim 5 wherein the rise time of said second signal is substantially greater than the rise time for said first signal.

9. Apparatus as in claim 5 wherein said second signal coupling and applying means includes means initially delaying second signal said predetermined time relative to said first signal.

10. Apparatus as in claim 1 and further including means for limiting the amplitude of said substantial output to a predetermined value below the amplitude thereof induced by the shifting of the core element from said first state to said second state.

11. Apparatus as in claim 10 wherein the limiting means includes a unidirectional device coupled to said winding.

12. Apparatus as in claim 10 wherein the limiting means includes two unidirectional devices coupled respectively to the first and second signal coupling means.

13. Apparatus for transferring information from a first bistable magnetic core element to a second bistable magnetic core element comprising said elements, a first winding on said first element and a second winding on said second element, means intercoupling said first and second winding, means for non-inductively coupling and applying a first signal across the first winding to cause said element to shift from a first stable state only if it was in said first state before application of said first signal, said shift in turn causing a back E.M.F. to be generated across said winding, and means for non-inductively coupling and applying in the same effective direction as said first signal a second signal to both said winding via the intercoupling means in at least partial concurrence with said first signal and including means responsive to said back E.M.F. for preventing effective coupling of said second signal to the first winding but not to said second winding when the first signal causes shift of said first element, the arrangement being such that said second core element is shifted to a predetermined state if not already therein by a substantial output to said second winding upon application of both of said signals concurrently at least in part if the first core element is shifted from said first state to said second state by the effect of said first signal.

14. Apparatus as in claim 13 wherein the intercoupling means includes a unidirectional device and said second signal is coupled at a junction between said unidirectional device and the second winding.

15. Apparatus as in claim 14 and further including a reactive impedance connected to said junction for delaying said second signal so as to be effective a predetermined time after occurrence of said first signal.

16. Apparatus as in claim 14 wherein said second signal coupling and applying means includes means effectively delaying said second signal a predetermined time in its application to at least said first winding.

17. Apparatus as in claim 16 wherein the second signal coupling and applying means causes the effective delay of said second signal to said first winding by causing the rise time of said second signal to be greater than the rise time of said first signal.

18. Apparatus as in claim 16 wherein the second signal coupling and applying means causes the effective delay by causing the starting time of said second signal to be initially delayed relative to the starting time of said first signal.

19. Apparatus as in claim 16 wherein the effective delay is caused by a resistor-condenser combination connected to said junction.

20. Apparatus as in claim 13 and further including means for limiting the amplitude of said substantial output to a predetermined amplitude below the amplitude of the voltage induced across the first winding means by the shift of the first element by said first signal.

21. Apparatus as in claim 20 wherein the limiting means includes a unidirectional device connected to said first winding.

22. Apparatus as in claim 20 wherein the limiting means includes first and second unidirectional devices connected respectively to the first and second signal coupling means.

23. Apparatus as in claim 13 and further including means for preventing receipt by said second winding of any output when the first core element is in said second state so as not to be shifted by the effect of said first signal.

24. Apparatus as in claim 23 wherein the receipt prevention means includes biasing means connected to said second winding whereby voltage induced in said first winding by said first signal when the first core element in said second state is counteracted by said biasing means.

25. Apparatus as in claim 23 wherein the intercoupling means includes a unidirectional device, said second signal being coupled to a junction between the unidirectional device and said second winding, and wherein the receipt prevention means includes means for delaying the effect of said second signal whereby a small voltage induced in said first winding when the first core element is not shifted by said first signal is blocked by the unidirectional device from effecting said second core element, said second signal being effective only after the occurrence of said small voltage.

26. Apparatus as in claim 25 wherein the receipt prevention means further includes biasing means connected to said second winding means whereby a second small voltage induced across said first winding means by said second signal after the occurrence of the first mentioned small voltage is substantially nullified.

27. Apparatus as in claim 13 and further including a third bistable magnetic core element having a third winding thereon, means coupling said first signal to the third winding, means coupling said second signal to the third winding, and means coupling said third winding to said second winding, the arrangement being such that a logical network is formed and said second core element, if shiftable, is shifted to said predetermined state in accordance with the states of said first and third core elements.

28. Apparatus as in claim 27 wherein said first and third winding are coupled to each of the first and second signal coupling means in parallel.

29. Apparatus as in claim 28 wherein the means intercoupling said first and second winding and the means intercoupling said second and third winding are in parallel as to said second winding, the arrangement being such that said second core element, if shiftable, is shifted to said predetermined state when either of said first or third core elements is shifted on the application of said first and second signals.

30. Apparatus as in claim 28 wherein the means intercoupling the first winding and the second winding includes at least part of the means intercoupling said second and third winding, the arrangement being such that said second core element, if shiftable, is shifted to said predetermined state only when both said first and third core elements are each in a first state so as to be shifted upon the application of said first and second signals.

31. Apparatus as in claim 13 and further including a third bistable magnetic core element having a third winding thereon, means coupling said third winding to a third signal, means coupling the third winding to a fourth signal, said third and fourth signals beginning at least at substantially the same time but occurring later than said first and second signals, means intercoupling said second and third winding, the arrangement being such that said second core element, if shiftable, is shifted to said predetermined state upon application of all of said signals in accordance with the states of said first and third core elements.

32. Apparatus for transferring information between a first bistable magnetic core element and a second bistable magnetic core element comprising said elements, first and second winding means on said first element and third and fourth winding means on said second element, means intercoupling said first and third winding means and means intercoupling said second and fourth winding means, means coupling a first signal to the first winding means, means for coupling a second signal to the means intercoupling said first and third winding means including means for preventing effective coupling of said second signal to the first winding means, means for coupling a third signal to said fourth winding means, means for coupling a fourth signal to the means intercoupling said second and fourth winding means including means for preventing an effective coupling of said fourth signal to the fourth winding means, said third and fourth signals being later in time than said first and second signals, the arrangement being such that upon presentation of said first and second signals, information is transferred from the first core element to the second core element and upon presentation of said third and fourth signals, information is transferred from said second element to the first element.

33. Apparatus as in claim 32 and further including magnetic core means for erasing the information in said first and second core elements.

34. Apparatus as in claim 33 wherein the erasing means includes a third bistable magnetic core element having fifth winding means thereon, means for coupling the fifth winding means to a fifth signal, means for coupling a sixth signal to said fifth winding means including means for preventing effective coupling of said sixth signal to the winding means, said fifth and sixth signals occurring at least in part between said second and fourth signals, and means intercoupling said fifth winding means and said third winding means, the arrangement being such that an output from said fifth winding means upon application of the fifth and sixth signals causes shift of said second core element in the same direction as does the third signal when applied to said fourth winding means.

35. Apparatus as in claim 33 and further including means for inserting information into one of said first and second core elements comprising an input bistable magnetic core element having fifth winding means thereon, means for coupling the fifth winding means to one of said first and third signals, means for coupling the fifth winding means to a like one of said second and fourth signals including means for preventing effective coupling thereof, means intercoupling said fifth winding with one of said second and fifth winding means, the arrangement being such that after erasure an output from said fifth winding means will provide new information for said first and second core elements.

36. Apparatus as in claim 32 and further including an output bistable magnetic core having fifth and sixth winding means thereon, means for coupling a fifth signal to said fifth winding means and means for coupling a sixth signal to said sixth winding means and means intercoupling said sixth winding means and one of said first and fourth winding means, said sixth signal occurring at the same time as either said second or fourth signal and said fifth signal occurring thereafter, the arrangement being such that information is transferred from said first and second core elements to said third core element upon application of said sixth signal whereby a non-complementing output is available at said fifth winding means upon receipt thereof of said fifth signal.

37. Apparatus as in claim 32 and further including a third bistable magnetic core element having fifth and sixth winding means thereon, means for coupling said fifth winding means to one of said first and fourth winding means including means for coupling the fifth winding means to the associated one of said second and fourth signals, means for coupling said fifth winding means to a fifth signal occurring at a time between said second and fourth signals, means for coupling said sixth winding means to a sixth signal occurring at a time between said second and fourth signals but at a time different than said fifth signal, the arrangement being such that said third core element is shifted by said fifth signal and said sixth signal causing from said sixth winding means an output representing the information contained in the first and second core elements as transferred to the fifth winding means.

38. Apparatus for transferring information from a first bistable magnetic element to a second bistable magnetic element in accordance with the remanence state of the first element, comprising said elements, a first winding on said first element and a second winding on said second element, a transfer circuit including first and second unidirectional current conducting devices connected serially in oposite senses and in series with each of said windings, means for applying a transfer signal voltage across said transfer circuit, one connection thereof being between said unidirectional devices to provide current through said first unidirectional device and at least part of said first winding in parallel with current through said second unidirectional device and at least part of said second winding, and means for connecting an interrogating signal to the first winding at a point between said first winding and said first unidirectional device, said transfer signal voltage and interrogating signal being concurrent at least in part, the arrangement being such that upon application of the interrogating signal, the first core element when in a first state provides a back E.M.F. across said first winding to block passage of said current through the first unidirectional device whereby the transfer current proceeds through the second unidirectional device to shift the second element, if shiftable, and when the first element is in a second state current may pass through both said unidirectional devices and through said windings but is ineffective to shift either of said magnetic elements.

39. Apparatus as in claim 38 and further including means for delaying the effective application of said transfer signal voltage across the transfer circuit relative to the effective application of said interrogating signal whereby the back E.M.F. in the first winding caused by said interrogating signal when the first element does not shift thereby subsides substantially before the effective transfer signal voltage can cause any current through the second unidirectional device and second winding.

40. Apparatus for detecting the state of a bistable magnetic core element comprising said element having a winding and an output circuit including a junction for receiving an input signal and means electrically and non-inductively coupling the signal from said junction to said winding whereby a first output signal is caused by a substantial back E.M.F. resulting in said winding when said element is shifted from one stable state to another by the receipt of said input signal and whereby a second output signal is caused by an insubstantial back E.M.F. resulting in said winding when said element does not shift during the receipt of said input signal, said first output signal having a substantially greater duration and voltage time integral than said second output signal, and further including the improvement comprising means for applying a second input signal directly to said winding, said second and first mentioned input signals being concurrent at least in part and said second input signal being sufficient to cause said substantial and insubstantial back E.M.F.'s in said winding in accordance with the state of said element, and means for causing said first mentioned input signal to effectively attain at least a given amplitude at said junction only after the time requred for any insubstantal back E.M.F. caused by the second input signal to subside substantially, the means coupling the first mentioned signal from the junction to said winding including a blocking device whereby a substantial back E.M.F. caused by the second signal blocks the first mentioned input signal from said winding and causes the first mentioned input signal as then present at said junction to be an output signal similar to said first output signal so as to indicate the occurrence of a shift in said core element, an insubstantial back E.M.F. caused by the second signal being ineffective due to the substantial subsiding thereof before said given amplitude is effectively attained at said junction by the first mentioned input signal to cause any output pulse having a voltage-time integral as great as that for said second output signal.

41. Apparatus as in claim 40 wherein the means for causing the said first mentioned input signal to effectively attain at least a given amplitude at said junction only after the time required for the insubstantial back E.M.F. caused by the second input signal to subside substantially includes a condenser coupled to said junction.

42. Apparatus as in claim 40 wherein the means for causing the said first mentioned input signal to effectively attain at least a given amplitude at said junction only after the time required for the insubstantial back E.M.F. caused by the second input signal to subside substantially includes means for making the rise time of the first mentioned input signal as present at least at said junction substantially greater than the rise time of said second input signal.

43. Apparatus as in claim 40 wherein the means for causing the said first mentioned input signal to effectively attain at least a given amplitude at said junction only after the time required for the insubstantial back E.M.F. caused by the second input signal to subside substantially includes means for delaying the first mentioned input signal a predetermined time.

44. Apparatus for transferring information from a bistable magnetic element to a load comprising said element and load, a winding inductively related to said element, a transfer circuit non-inductively coupled to said winding and connected to said load, means non-inductively coupled to said winding for applying a first signal thereacross to cause said element to shift from a first stable state to a second stable state only if it was in said first state before application of said first signal, said shift in turn causing a back E.M.F. to be generated across said winding, and means directly coupled to said transfer circuit for applying a second signal thereacross and consequently non-inductively across said winding in the same effective direction as said first signal and in at least partial concurrence with said first signal and including means responsive to said back E.M.F. for preventing effective coupling of said second signal to said winding when the first signal causes shift of said first element as aforesaid and for concurrently diverting said second signal to said load, the arrangement being such that said load receives a substantial output upon application of both of said signals concurrently at least in part only if the magnetic element is shifted from said first state to said second state by the effect of said first signal.

45. Apparatus for transferring information from a bistable magnetic element to a load in accordance with the remanent state of the element, comprising said element and load, a winding inductively related to said element, a transfer circuit including first and second unidirectional current conducting devices connected serially in opposite senses and in series with said winding and load, means for applying a transfer signal voltage across said transfer circuit with one connection thereof being between said unidirectional devices to provide transfer current through said first unidirectional device and at least part of said winding and transfer current through said second unidirectional device and at least part of said load, and means for connecting an interrogating signal to said winding at a point between the winding and said first unidirectional device in the same effective direction as said transfer signal voltage to cause said element to shift from a first stable state to a second stable state only if it was in said first state before application of said first signal, said shift in turn causing a back E.M.F. to be generated across said winding, said transfer signal voltage and interrogating signal being concurrent at least in part, said first unidirectional device being poled so that said back E.M.F. across said winding blocks passage of said transfer current through the first unidirectional device whereby the transfer current proceeds through the second unidirectional device providing a substantial output and transfer information to said load, the arrangement being such that when said element is in a second state transfer current may pass through both said unidirectional devices and through said winding and load but is ineffective to shift said magnetic element or to indicate to said load any effectve transfer of information from said element.

References Cited in the file of this patent

UNITED STATES PATENTS

| | | |
|---|---|---|
| 2,652,501 | Wilson | Sept. 15, 1953 |
| 2,683,819 | Rey | July 13, 1954 |
| 2,708,722 | An Wang | May 17, 1955 |
| 2,741,758 | Cray | Apr. 10, 1956 |
| 2,751,509 | Torrey | June 19, 1956 |
| 2,792,506 | Torrey | May 14, 1957 |
| 2,808,578 | Goodell et al. | Oct. 1, 1957 |
| 2,825,690 | Ridler et al. | Mar. 4, 1958 |
| 2,892,998 | Eckert et al. | June 30, 1959 |

OTHER REFERENCES

"Magnetic Elements in Arithmetic and Control Circuits," by I. L. Auerbach et al., pub. September 1955, "Electrical Engineering," pp. 766–770.